(12) United States Patent
Jansson

(10) Patent No.: US 10,682,713 B2
(45) Date of Patent: Jun. 16, 2020

(54) INDEXABLE SINGLE-SIDED CUTTING INSERT WITH MEANS FOR PREVENTING IMPROPER MOUNTING OF THE INSERT, AND CUTTING TOOL INCLUDING SUCH AN INSERT

(71) Applicant: SECO TOOLS AB, Fagersta (SE)

(72) Inventor: Per Rickard Jansson, Fagersta (SE)

(73) Assignee: Seco Tools AB, Fagersta (SE)

( * ) Notice: Subject to any disclaimer, the term of this patent is extended or adjusted under 35 U.S.C. 154(b) by 36 days.

(21) Appl. No.: 16/300,502

(22) PCT Filed: Apr. 26, 2017

(86) PCT No.: PCT/EP2017/059853
§ 371 (c)(1),
(2) Date: Nov. 9, 2018

(87) PCT Pub. No.: WO2017/194304
PCT Pub. Date: Nov. 16, 2017

(65) Prior Publication Data
US 2019/0283151 A1    Sep. 19, 2019

(30) Foreign Application Priority Data

May 13, 2016   (EP) .................................... 16169608
May 13, 2016   (EP) .................................... 16169611

(51) Int. Cl.
*B23C 5/20*       (2006.01)
*B23C 5/22*       (2006.01)

(52) U.S. Cl.
CPC .... *B23C 5/2221* (2013.01); *B23C 2200/0416* (2013.01); *B23C 2200/085* (2013.01);
(Continued)

(58) Field of Classification Search
CPC ............ B23C 5/2221; B23C 2200/125; B23C 2200/164; B23C 2200/367;
(Continued)

(56) References Cited

U.S. PATENT DOCUMENTS 6,872,034 B2 *   3/2005   Satran .................... B23C 5/2213
                                                           407/103
7,063,489 B2 *   6/2006   Satran .................... B23C 5/1072
                                                           407/113
(Continued)

FOREIGN PATENT DOCUMENTS

| DE | 29907623 U1 | 7/1999 |
| EP | 2404690 A1 | 1/2012 |
| WO | 00/02693 A1 | 1/2000 |

*Primary Examiner* — Sara Addisu
(74) *Attorney, Agent, or Firm* — Corinne R. Gorski

(57) ABSTRACT

A cutting insert includes a rake end surface having four corners and, in a center thereof, a central surface portion. A supporting end surface has four corners and, in a center thereof, a central supporting surface portion. A peripheral side surface extends between the rake end surface and the supporting end surface. The peripheral side surface includes two opposing major side surfaces. A hole extends through the cutting insert from one of the major side surfaces to the other of the major side surfaces, wherein the central surface portion is disposed at a greater distance from a central axis (A) of the hole than is the central supporting surface portion. The single-sided cutting insert has a corner radii or cutting edge radii that extend over at least a quarter of a width of the cutting insert.

19 Claims, 9 Drawing Sheets

(52) U.S. Cl.
CPC .. *B23C 2200/125* (2013.01); *B23C 2200/164* (2013.01); *B23C 2200/168* (2013.01); *B23C 2200/203* (2013.01); *B23C 2200/367* (2013.01)

(58) Field of Classification Search
CPC ........ B23C 2200/361; B23C 2200/203; B23C 2200/366; B23C 2200/416; B23C 2200/085; B23B 27/1622; B23B 2200/323; B23B 2200/3618; B23B 2200/3627
See application file for complete search history.

(56) References Cited

U.S. PATENT DOCUMENTS

| | | | | |
|---|---|---|---|---|
| 7,241,082 | B2* | 7/2007 | Smilovici | B23C 5/2221 |
| | | | | 407/113 |
| 8,449,230 | B2* | 5/2013 | Nguyen | B23C 5/109 |
| | | | | 407/113 |
| 2006/0045636 | A1* | 3/2006 | Johnson | B23C 5/06 |
| | | | | 407/42 |
| 2009/0136304 | A1* | 5/2009 | Satran | B23C 5/207 |
| | | | | 407/104 |
| 2011/0129309 | A1* | 6/2011 | Kovac | B23C 5/06 |
| | | | | 407/42 |
| 2015/0117968 | A1* | 4/2015 | Brunetto | B23C 5/207 |
| | | | | 407/42 |
| 2016/0303665 | A1* | 10/2016 | Hecht | B23C 5/06 |
| 2017/0297120 | A1* | 10/2017 | Fang | B23C 5/2247 |
| 2018/0133813 | A1* | 5/2018 | Brunetto | B23C 5/207 |

\* cited by examiner

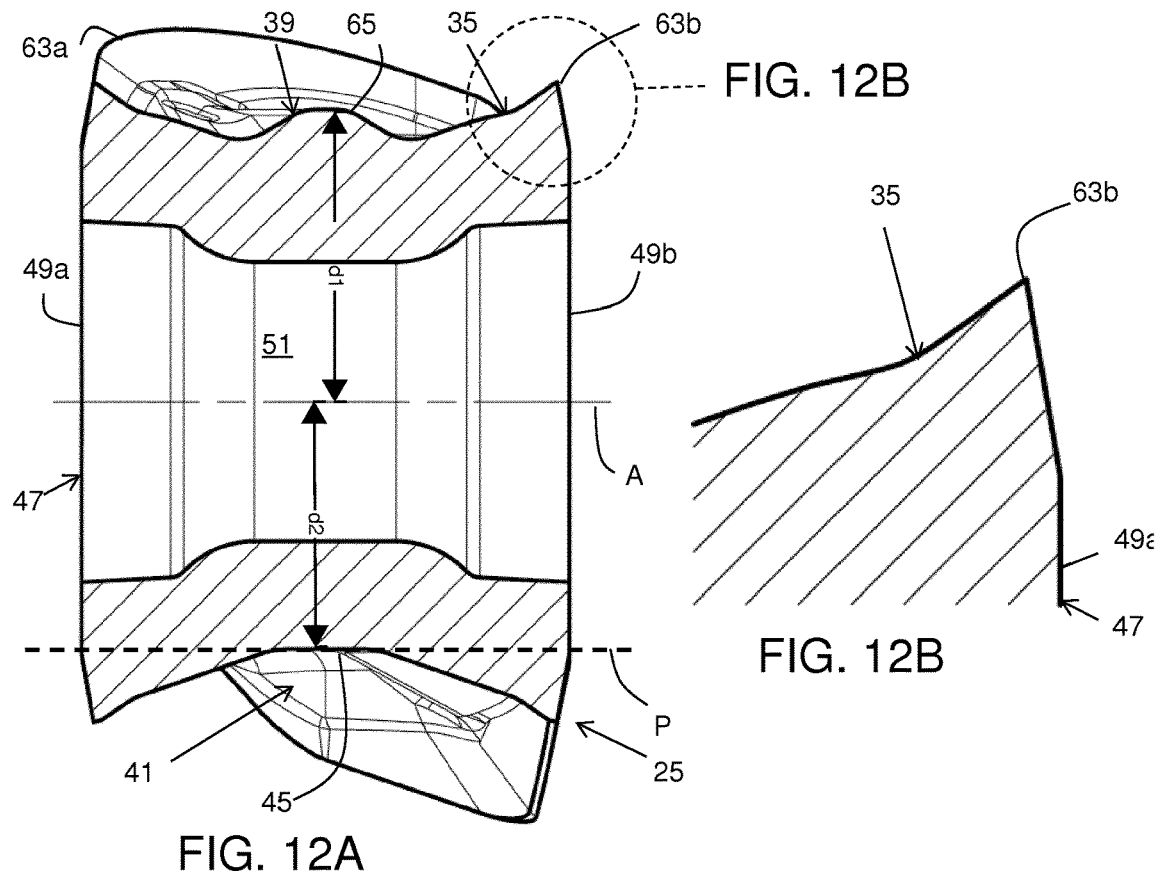
FIG. 12A
FIG. 12B
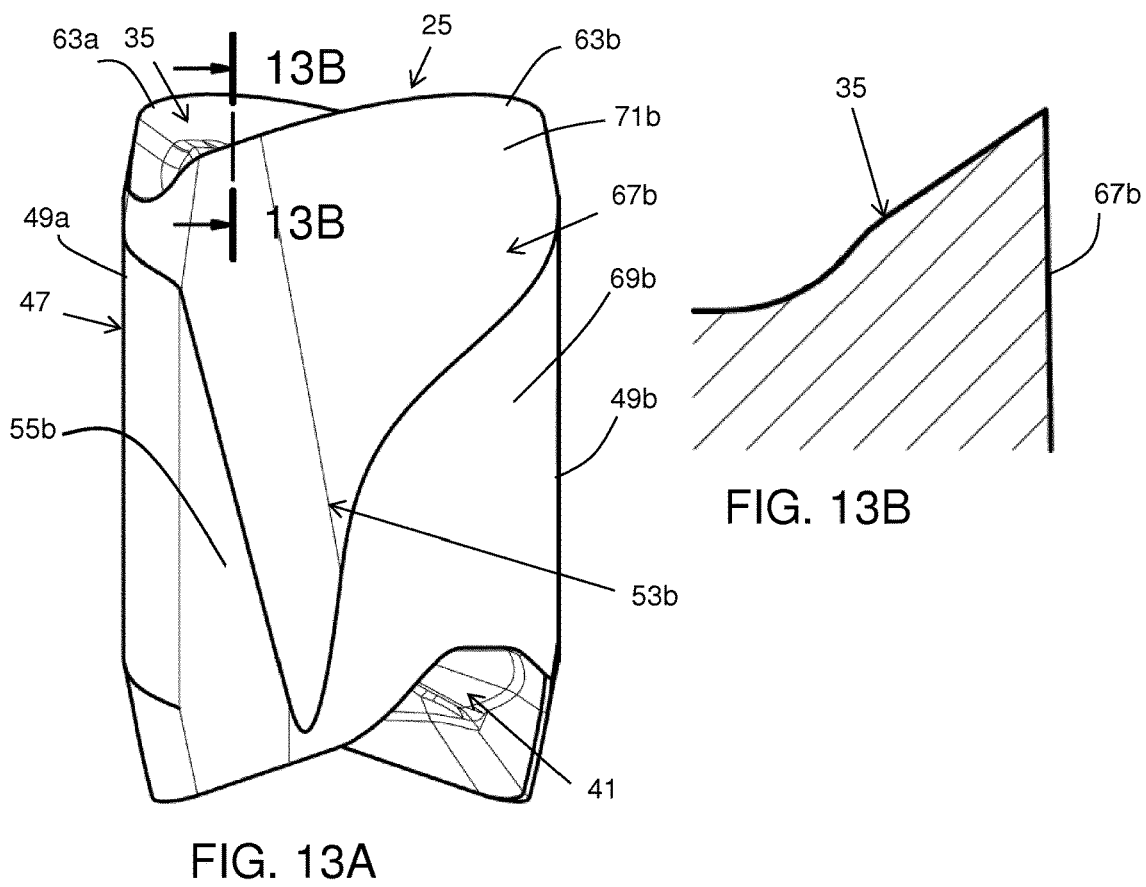
FIG. 13A
FIG. 13B

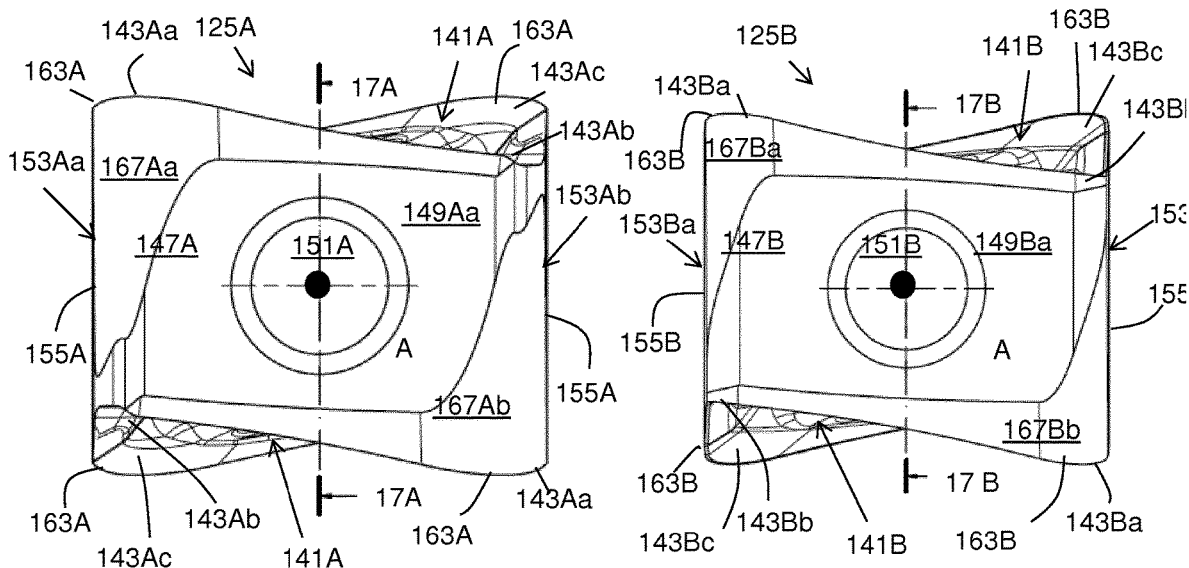
FIG. 16A  FIG. 16B
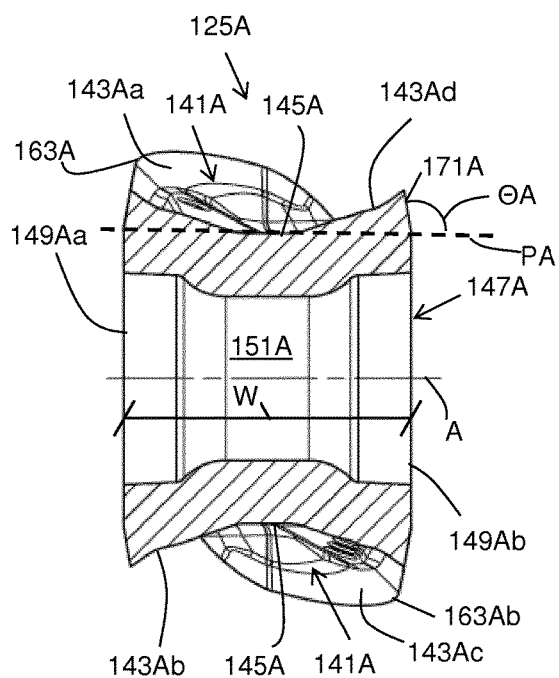 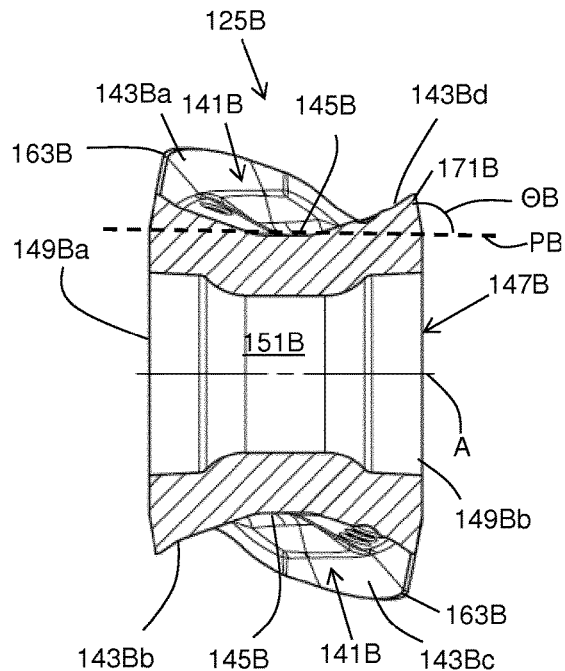
FIG. 17A  FIG. 17B

INDEXABLE SINGLE-SIDED CUTTING INSERT WITH MEANS FOR PREVENTING IMPROPER MOUNTING OF THE INSERT, AND CUTTING TOOL INCLUDING SUCH AN INSERT

RELATED APPLICATION DATA

This application is a § 371 National Stage Application of PCT International Application No. PCT/EP2017/059853 filed Apr. 26, 2017 claiming priority to EP 16169608.3 and EP 16169611.7 each filed May 13, 2016.

BACKGROUND AND SUMMARY

The present invention relates generally to indexable cutting inserts and cutting tools including such indexable cutting inserts and, more particularly, to indexable cutting inserts and cutting tools including such indexable cutting inserts that prevent improper mounting of the cutting inserts on a toolholder.

In designing cutting inserts, it is typically desirable to provide the cutting insert with the maximum number of usable cutting edges possible so that the insert can be indexed to different positions to permit use of a new cutting edge when an edge is worn or broken. Inserts are typically mounted to toolholders by means such as clamping screws or bolts, and many current designs permit an insert to be indexed by turning the insert around the bolt so that a fresh cutting edge is moved to a working or active position. In addition, many current designs are of "double-sided" inserts that permit the insert to be flipped over so that the insert can be indexed around the screw or bolt, such as is shown in U.S. Pat. No. 7,241,082.

When making smaller inserts intended to be used to machine smaller items or shapes, it becomes increasingly difficult to make indexable inserts without compromising the strength of the insert or the ability to provide sufficient surface space on the insert for mounting of the insert against abutment surfaces on a toolholder. It is necessary to provide a hole through the insert for the mounting screw or bolt and, particularly in the case of double-sided cutting inserts, as insert size becomes smaller, a trade-off must often be made between providing a smaller, more fragile screw or bolt or a more fragile insert that has only minimal insert material between the hole and working surfaces of the insert.

A tangentially mounted cutting insert is disclosed in DE 29907623 U1.

U.S. application Ser. No. 14/569,960, filed entitled REINFORCED DOUBLE-SIDED CUTTING INSERT AND CUTTING TOOL WITH REINFORCED DOUBLE-SIDED CUTTING INSERT, which is incorporated by reference, provides one solution to the problem of providing a hole of sufficient size in a small cutting insert without unduly compromising the strength of the insert by providing a cutting insert 225 having the general shape as shown in FIG. 7 for mounting in a toolholder 23 of the general type shown in FIGS. 3-6. A hole 251 extends through a peripheral side surface 247 of the cutting insert 225 from one major side surface 249 to an identical opposing major side surface. The cutting insert 225 also includes two identical supporting end surfaces 241 and two identical minor side surfaces 253. Each minor side surface 253 includes two planar but typically non-coplanar supporting surface portions 255. The four supporting surface portions 255 correspond to four respective cutting edges 263, two cutting edges being formed at the intersection of one of the supporting end surfaces 241 and the peripheral side surface 247 and two cutting edges being formed at the intersection of the other one of the supporting end surfaces and the peripheral side surface. The cutting insert 225 is seated in a pocket 27 of the toolholder 23 so that one of the major side surfaces 249 abuts a major side surface abutting surface 29 of the pocket, one of the supporting end surfaces 241 abuts a central supporting surface portion abutting surface 31 of the pocket, and one of the supporting surface portions 255 abuts a minor side surface abutting surface 33 of the pocket. In this position, the hole 251 aligns with an internally threaded hole 57 in the toolholder 23 and the cutting insert 225 can be clamped relative to the toolholder 23 by a screw in a conventional fashion (see, e.g., FIG. 1). The cutting insert 225 can be indexed in the pocket 27 to four different positions to expose the four cutting edges 263 to a workpiece by rotating the insert 180° about an axis through the hole 251, and by turning the insert 180° without rotating the insert about the axis through the hole. Because the hole 251 through the insert is formed through the major side surface, which is a surface of the insert having a large area relative to, e.g., the supporting end surface or the minor side surface, the hole can be larger than if the hole extended through either the supporting end surface or the minor side surface.

The solution offered by U.S. application Ser. No. 14/569,960 is well suited for small inserts with relatively small corner radii at the cutting edges and corners of the cutting insert by the cutting edges. The inventors have recognized that, as the corner radii become larger, the area available to form the supporting surface portions 255 becomes smaller and once a curved portion of the cutting edge or the corners of the cutting insert extend to one half of the width of the cutting insert measured between the major side surfaces along the axis of the insert, there is effectively no area that can form a planar supporting surface on the minor side surface. The applicants have recognized that, when it is desired to provide an insert with a large corner radius R (see FIG. 14) that diminishes the size of the minor side surface and the supporting surface portions, it may be desirable or necessary that the insert be a single-sided insert. A "large" radius is intended to refer to inserts having corner radii or cutting edge radii that extend over at least a quarter of a width of the insert and, more typically, over more than one half of the width of the insert. The applicants have further recognized that it is desirable to structure such an insert so that the insert cannot be improperly mounted with insufficient support along the minor side surface of the insert.

Accordingly, it is desirable to provide a cutting insert with means for preventing improper mounting of the insert, and a cutting tool including such an insert.

In accordance with an aspect of the present invention, a cutting insert comprises a rake end surface having four corners and, in a center thereof, a central surface portion, a supporting end surface having four corners and, in a center thereof, a central supporting surface portion, a peripheral side surface extending between the rake end surface and the supporting end surface, the peripheral side surface comprising two opposing major side surfaces, a hole extending through the cutting insert from one of the major side surfaces to the other of the major side surfaces, and wherein the central surface portion is disposed at a greater distance from a central axis of the hole than is the central supporting surface portions. The single-sided cutting insert has a corner radii or cutting edge radii that extend over at least a quarter of a width of the cutting insert.

In accordance with another aspect of the present invention, a cutting tool comprises a toolholder, the toolholder comprising a cutting insert receiving pocket, the cutting insert receiving pocket comprising a major side surface abutting surface and a central supporting surface portion abutting surface, and a cutting insert as set forth above, wherein one of the two major side surfaces of the cutting insert abuts the major side surface abutting surface and the central supporting surface portion abuts the central supporting surface portion abutting surface when the cutting insert is received in the cutting insert receiving pocket.

BRIEF DESCRIPTION OF THE DRAWINGS

The features and advantages of the present invention are well understood by reading the following detailed description in conjunction with the drawings in which like numerals indicate similar elements and in which:

FIG. 12A is a cross-sectional view of the cutting insert of FIG. 10 taken at section 12A-12A of FIG. 11;

FIG. 12B is an enlarged view of a portion of FIG. 12A;

FIG. 13A is an end view of the cutting insert of FIG. 10;

FIG. 13B is a cross-sectional view taken at section 13B-13B of FIG. 13A;

FIGS. 16A and 16B are side views of the cutting inserts of FIGS. 9A and 9B, respectively;

FIGS. 17A and 17B are cross-sectional views of the cutting inserts of FIGS. 9A and 9B, respectively, taken at sections 17A-17A and 17B-17B, respectively, of FIGS. 16A and 16B, respectively;

Figure 1:
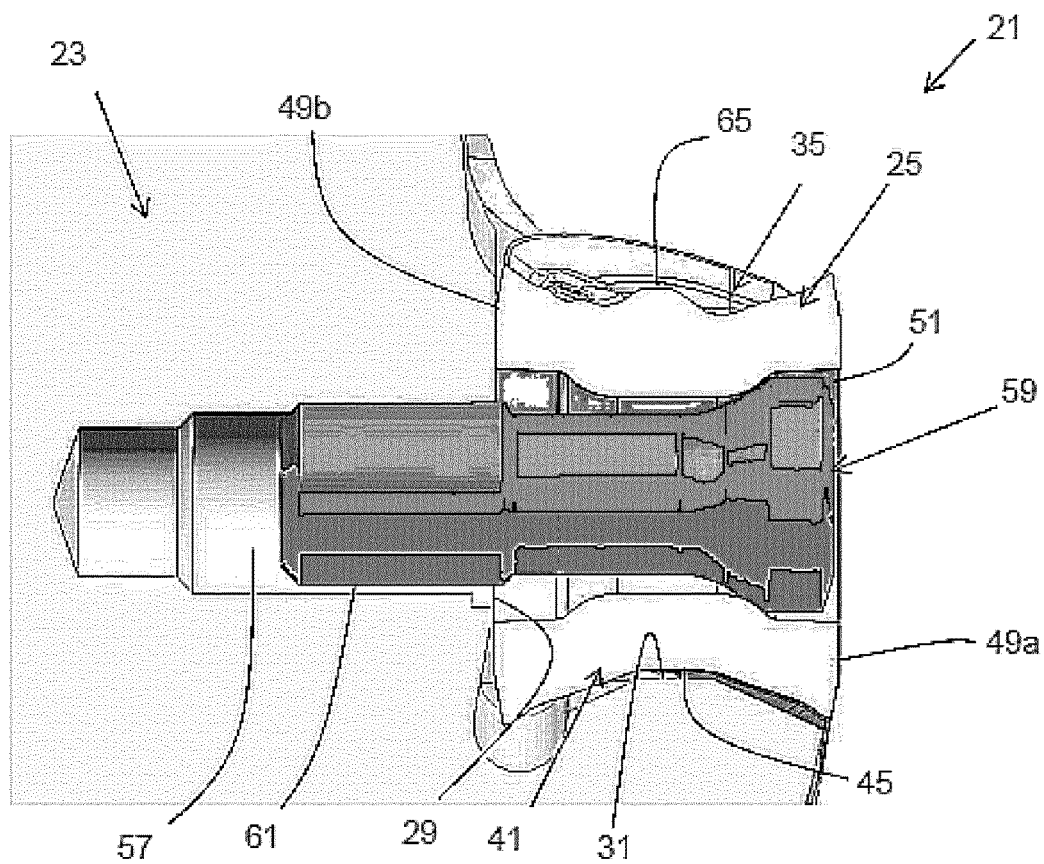
FIG. 1 is a cross-sectional view of a portion of a cutting tool according to an aspect of the present invention showing proper mounting of a cutting insert.

Each figure in the drawings is drawn to scale. However, sizes of cutting inserts maybe reduced or enlarged by a certain amount.

DETAILED DESCRIPTION

Figure 2:
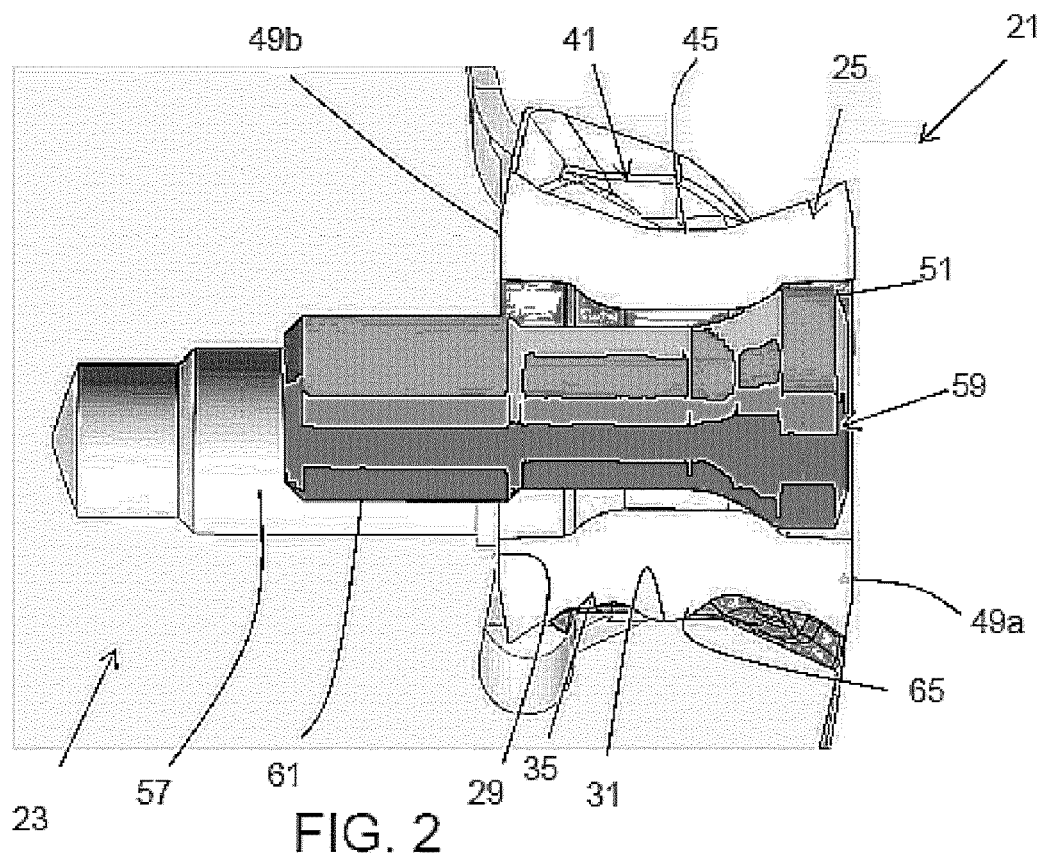
FIG. 2 is a cross-sectional view of a portion of a cutting tool according to an aspect of the present invention showing improper mounting of a cutting insert.
Figure 3:
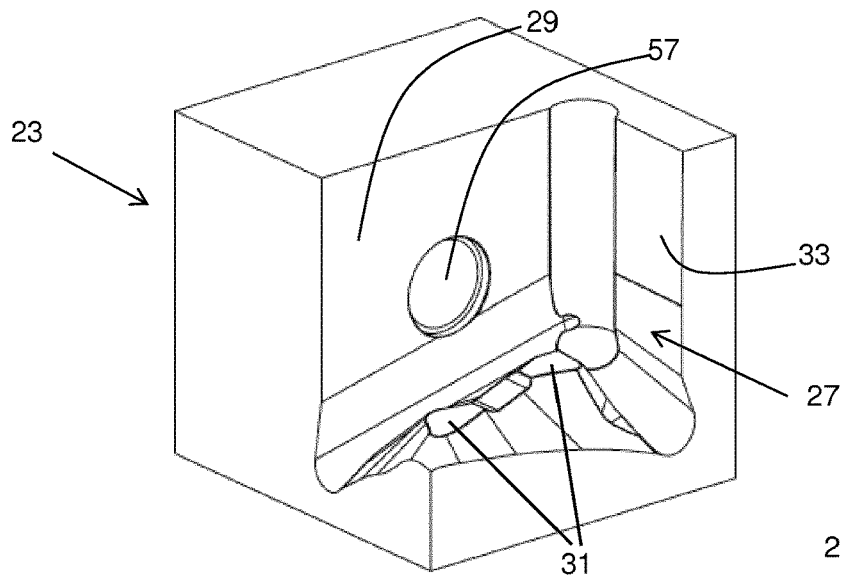
FIG. 3 is a perspective view of a portion of a toolholder for a cutting tool according to an aspect of the present invention.
Figure 4:
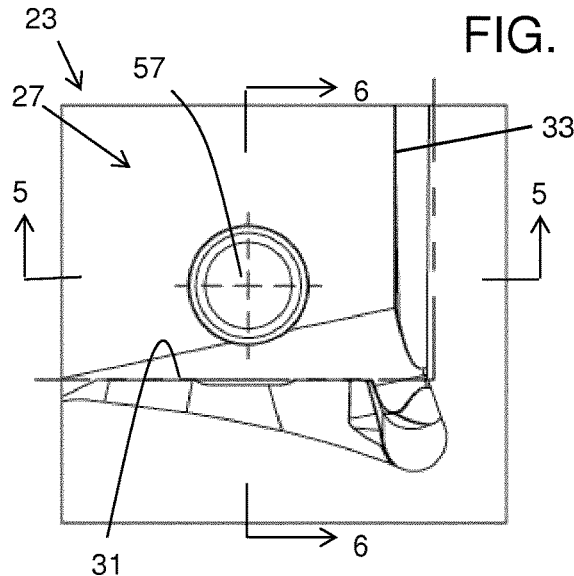
FIG. 4 is a plan view of a portion of the toolholder of FIG. 3.
Figure 5:
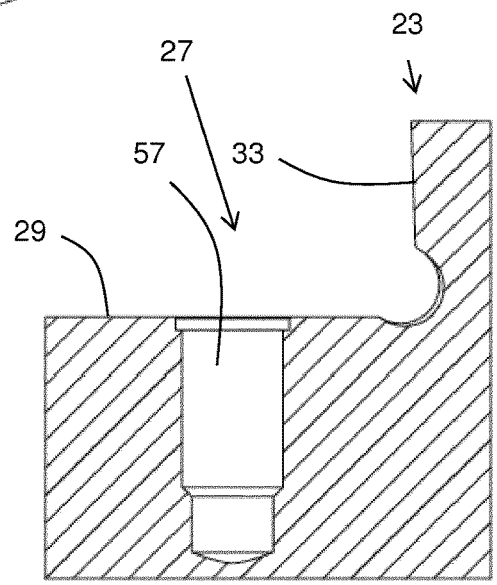
FIG. 5 is a cross-sectional view of the toolholder of FIG. 3 taken at section 5-5 of FIG. 4.
Figure 6:
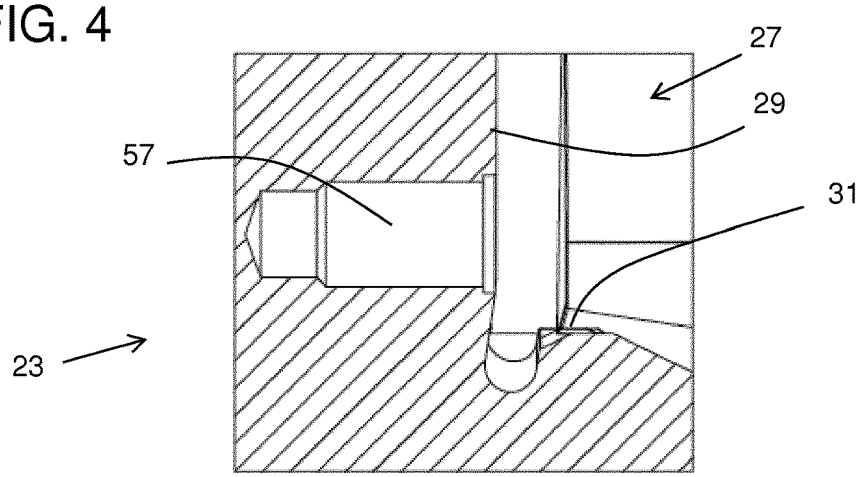
FIG. 6 is a cross-sectional view of the toolholder of FIG. 3 taken at section 6-6 of FIG. 4.

A portion of a cutting tool 21 according to an aspect of the present invention is shown in FIGS. 1-2. The cutting tool 21 is typically a rotating tool such as a milling cutter, a drill, or a boring tool. The cutting tool 21 comprises a toolholder 23, a portion of which is shown in FIGS. 3-6, and a cutting insert 25 (FIGS. 8 and 10-15) or 125A or 125B (FIGS. 9A-9B and 16A-21B) according to another aspect of the invention. The toolholder 23 comprises a cutting insert receiving pocket 27, the pocket comprising a major side surface abutting surface 29 and a central supporting surface portion abutting surface 31, and a minor side surface abutting surface 33.

In an aspect of the invention involving the cutting insert 25, the cutting insert comprises a rake end surface 35 having four corners 37a-d (e.g., FIGS. 8 and 14) and, in a center thereof, a central surface portion 39. The cutting insert 25 comprises a supporting end surface 41 having four corners 43a-d (e.g., FIG. 15) and, in a center thereof, a central supporting surface portion 45 (e.g., FIG. 15). A peripheral side surface 47 extends between the rake end surface 35 and the supporting end surface 41.

The peripheral side surface 47 comprises two opposing major side surfaces 49a-b. A hole 51 extends through the cutting insert 25 from one of the major side surfaces 49a or 49b to the other of the major side surfaces 49b or 49a. The peripheral side surface 47 also includes two opposing minor side surfaces 53a-b, each minor side surface including a supporting surface portion 55a-55b. The major side surfaces 49a-b are typically, but not necessarily, identical to each other, and the minor side surfaces 53a-53b are typically, but not necessarily, identical to each other. When the cutting insert 25 is seated in the cutting insert receiving pocket 27, one of the major side surfaces 49a or 49b abuts the major side surface abutting surface 29 and one of the minor side surfaces 53a or 53b, and, more particularly, one of the supporting surface portions 55a or 55b, abuts the minor side surface abutting surface 33. The central supporting surface portion 45 (FIG. 15) abuts the central supporting surface portion abutting surface 31 when the cutting insert is received in the cutting insert receiving pocket 27.

The central surface portion 39 of the cutting insert 25 is disposed at a greater distance from a central axis A (FIG. 12A) of the hole 51 than is the central supporting surface portion 45. The reference to the central surface portion 39 of the cutting insert 25 being disposed at a greater distance from the central axis A of the hole 51 than is the central supporting surface portion 45 is expressly defined herein as meaning that the central portion is in whole or in part disposed at a first distance d1 from the central axis of the hole that is greater than a second distance d2 from the central axis of the hole to the central supporting surface portion. The difference between the distances d1 and d2 may be chosen in the range of 0.2 to 1.1 mm, preferably 0.5 to 0.9 mm. The toolholder 23 comprises an internally threaded hole 57 in the major side surface abutting surface 29, and the cutting tool 21 comprises a clamping screw 59 with external threads 61 adapted to mate with internal threads of the internally threaded hole and to extend through the hole 51 in the cutting insert 25 to clamp the cutting insert in the cutting insert receiving pocket 27. The hole 51 has a narrow center portion against which a head of the screw 59 abuts to clamp the cutting insert 25 in the cutting insert receiving pocket 27 of the toolholder 23.

As seen in FIG. 1, the internally threaded hole 57 in the toolholder 23 and the hole 51 in the cutting insert 25 are axially aligned when either of the two major side surfaces 49a or 49b of the cutting insert 25 abuts the major side surface abutting surface 33 and the central supporting surface portion 45 abuts the central supporting surface portion abutting surface 31 when the cutting insert is received in the cutting insert receiving pocket 27. Axially aligned is defined in this case as meaning that the internally threaded hole 57 and the hole 51 in the cutting insert 25 are sufficiently axially aligned so that the external threads 61 of the screw 59 can mate with the threads of the internally threaded hole 57. While not necessary, it is presently believed to be convenient for the central supporting surface portion 45 and the central supporting surface portion abutting surface 31 to both be in the form of one or more planar surfaces. As seen in FIG. 12B, for example, the central supporting surface portion 45 can lie in a plane P and the axis A of the hole 51 can be parallel to the plane.

On the other hand, as seen in FIG. 2, because the central surface portion 39 of the cutting insert 25 is disposed at a greater distance from a central axis A (FIG. 12A) of the hole 51 than is the central supporting surface portion 45, the internally threaded hole 57 in the toolholder 23 and the hole in the cutting insert are axially mis-aligned when either of the two major side surfaces 49a or 49b of the cutting insert abuts the major side surface abutting surface 29 and the central surface portion 39 abuts the central supporting surface portion abutting surface 31. In this position, the external threads 61 of the screw 59 cannot properly mate with the threads of the internally threaded hole 57.

The cutting insert 25 comprises two spaced apart cutting edges 63a-b on the rake end surface 35. Each cutting edge 63a-b is formed at an intersection of the peripheral side surface 47 with the rake end surface 35. The cutting edges 63a-b are disposed at non-adjacent corners of the rake end surface 35.

The single-sided cutting insert 25 has a corner radii or cutting edge radii R that extend over at least a quarter of a width W of the cutting insert.

In the embodiment shown in FIGS. 1-2, 8, and 10-15, the central surface portion 39 comprises a ridge 65. The ridge 65 is ordinarily non-parallel to the central axis A (FIG. 14) of the hole 51. The ridge 65 ordinarily extends generally in a direction between two non-adjacent corners of the rake end surface 35 and, more particularly, extends generally in a direction between two spaced apart cutting edges 63a-b disposed at the non-adjacent corners of the rake end surface so that the ridge causes minimal interference with flow of chips cut from a workpiece by the cutting edges. The ridge 65 may form an acute angle α in the range of 50 to 70°, preferably 55 to 65°.

The central surface portion 39 can have a shape that is similar to or identical to the central supporting surface portion 45 except that it is disposed at a greater distance from a central axis A of the hole 51 than is the central supporting surface portion 45 in whole or in part. When the ridge 65 or some other structure such as a protrusion is provided, other portions of the central surface portion 39 can be at the same distance from the central axis A of the hole 51 as the central supporting surface portion 45.

The peripheral side surface 47 comprises a curved surface portion 67a and 67b between each minor side surface 53a and 53b and each major side surface 49a and 49b. Each curved surface portion 67a and 67b ordinarily comprises a portion 69a and 69b closest to the supporting end surface 41 that extends in a direction that is parallel with a portion 69b and 69a, respectively, closest to the supporting end surface on the other curved surface portion 67b and 67a, respectively. Each curved surface portion 67a and 67b also ordinarily comprises a portion 71a and 71b closest to the rake end surface 35 that forms a non-zero angle with a portion 71b and 71a, respectively, closest to the rake end surface on the other curved end surface 67b and 67a, respectively. In this way, the cutting insert 25 can be provided with a negative shape that can facilitate manufacturing by a direct pressing technique in which one or both of two mold halves are moved relative to each other to first compress material for forming the cutting insert and thereafter separated to remove the compressed cutting insert which is typically thereafter sintered. Such pressed and sintered inserts are typically made of a cemented carbide material.

Figure 7:
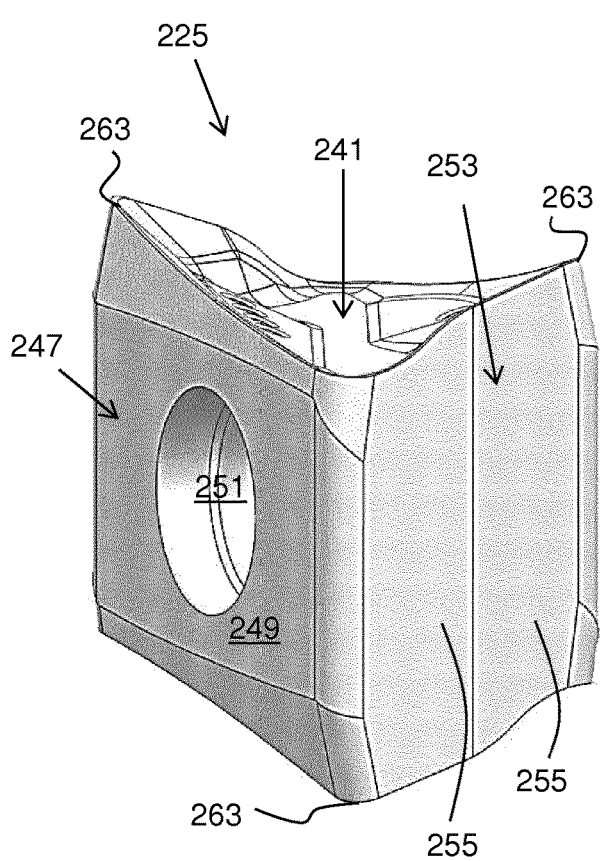
FIG. 7 is a perspective view of a cutting insert according to U.S. application Ser. No. 14/569,960.
Figure 8:
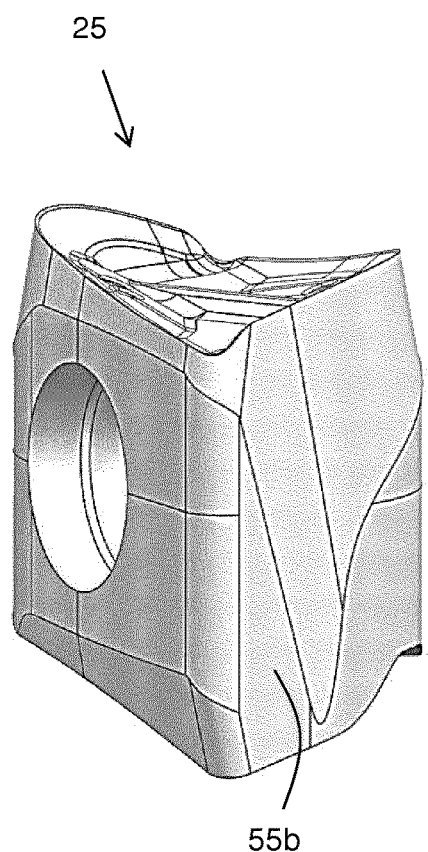
FIG. 8 is a perspective view of a cutting insert according to an aspect of the present invention.
Figure 9A:
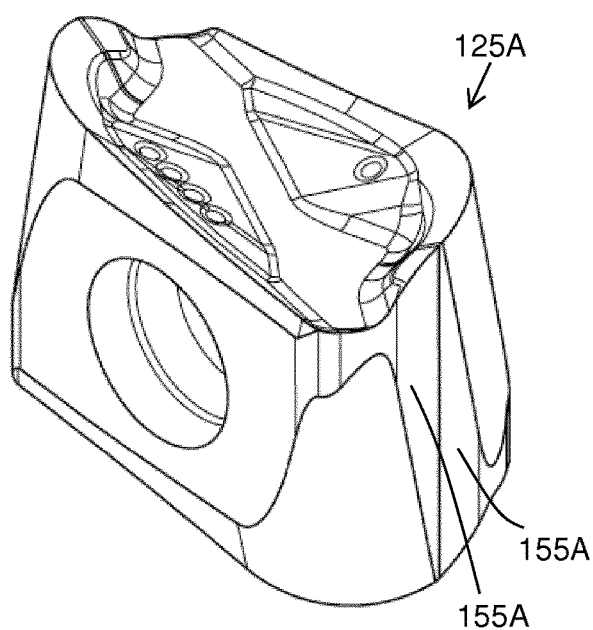
FIGS. 9A and 9B are perspective views of embodiments of a cutting insert according to an aspect of the present invention.
Figure 9B:
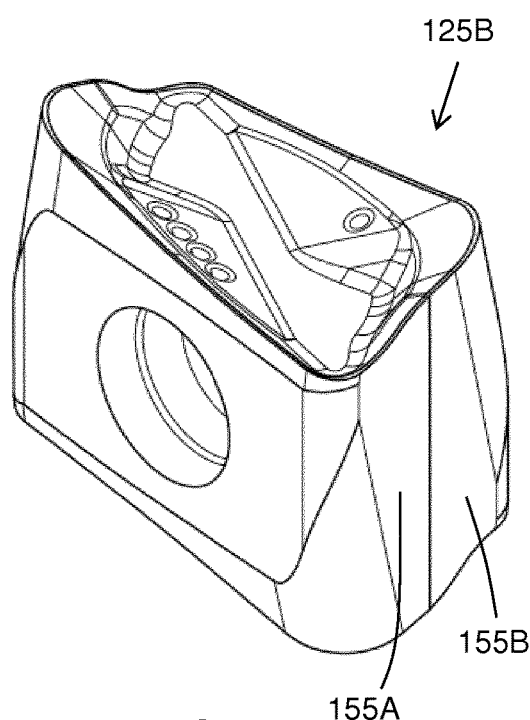
Figure 10:
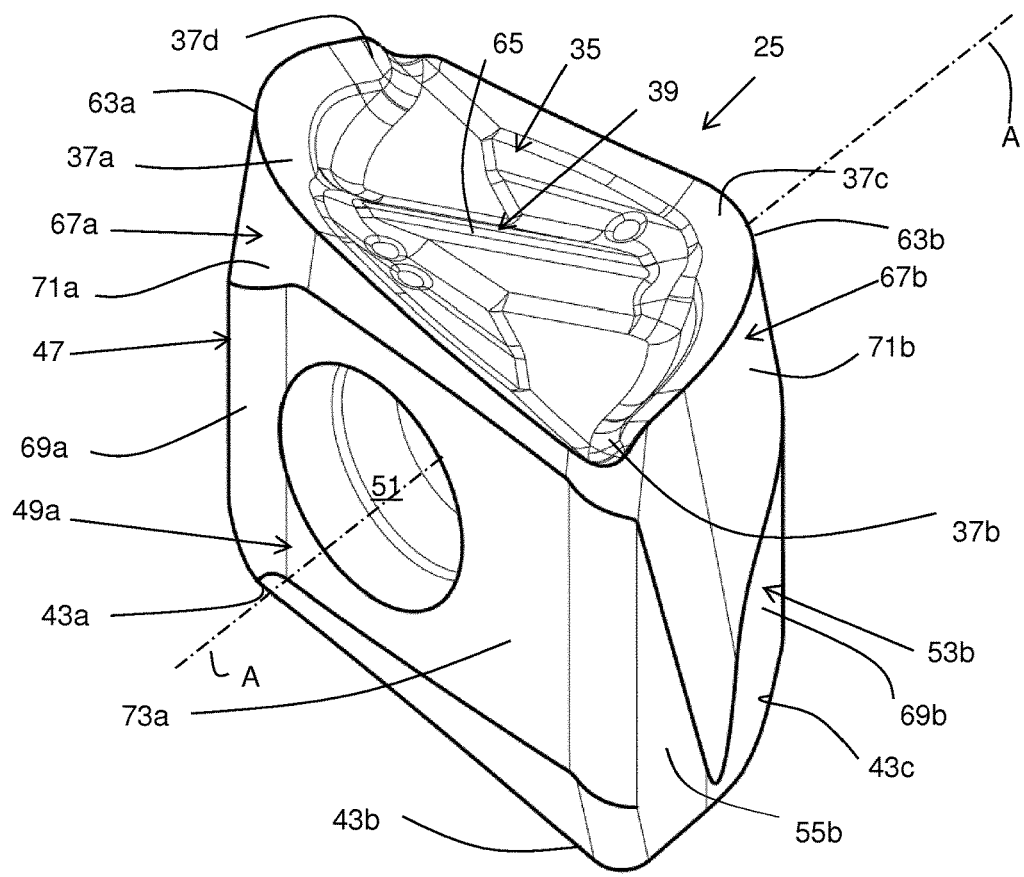
FIG. 10 is a perspective view of the cutting insert of FIG. 8 taken from a different perspective.
Figure 11:
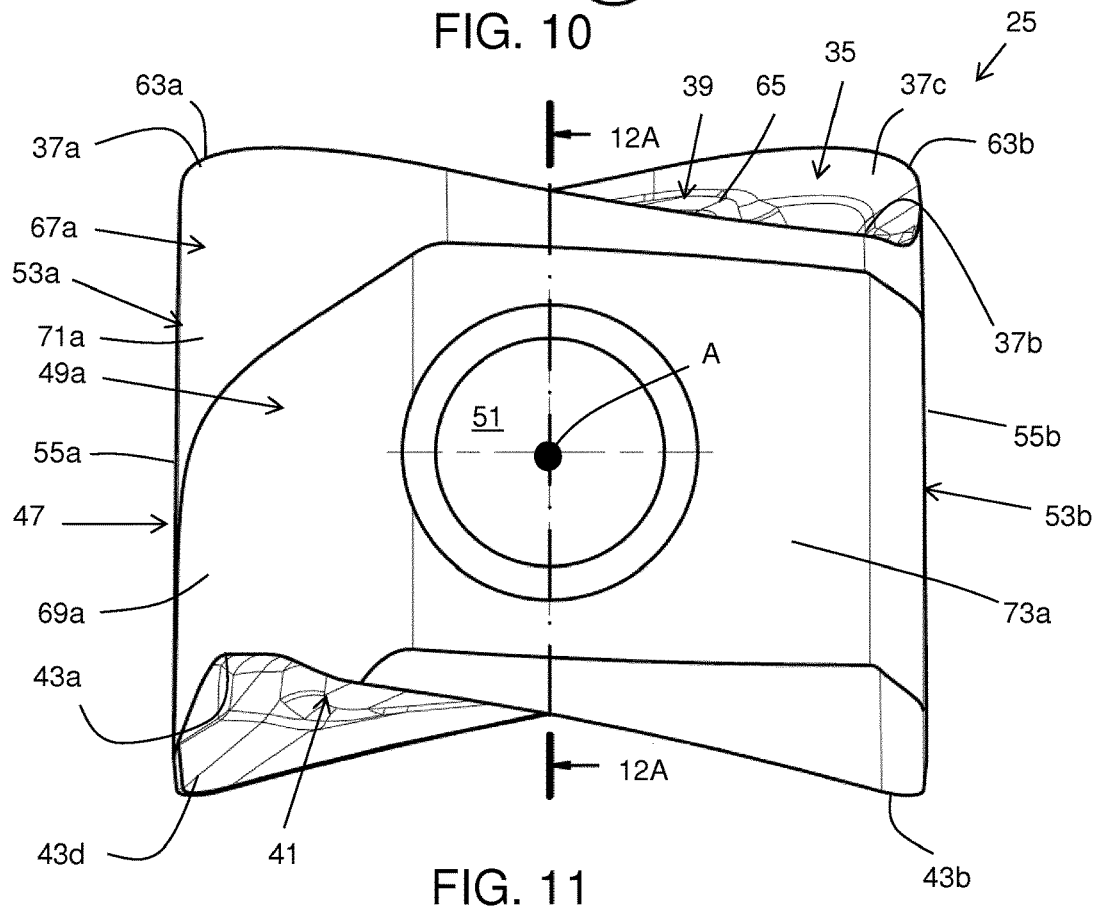
FIG. 11 is a side view of the cutting insert of FIG. 10.
Figure 14:
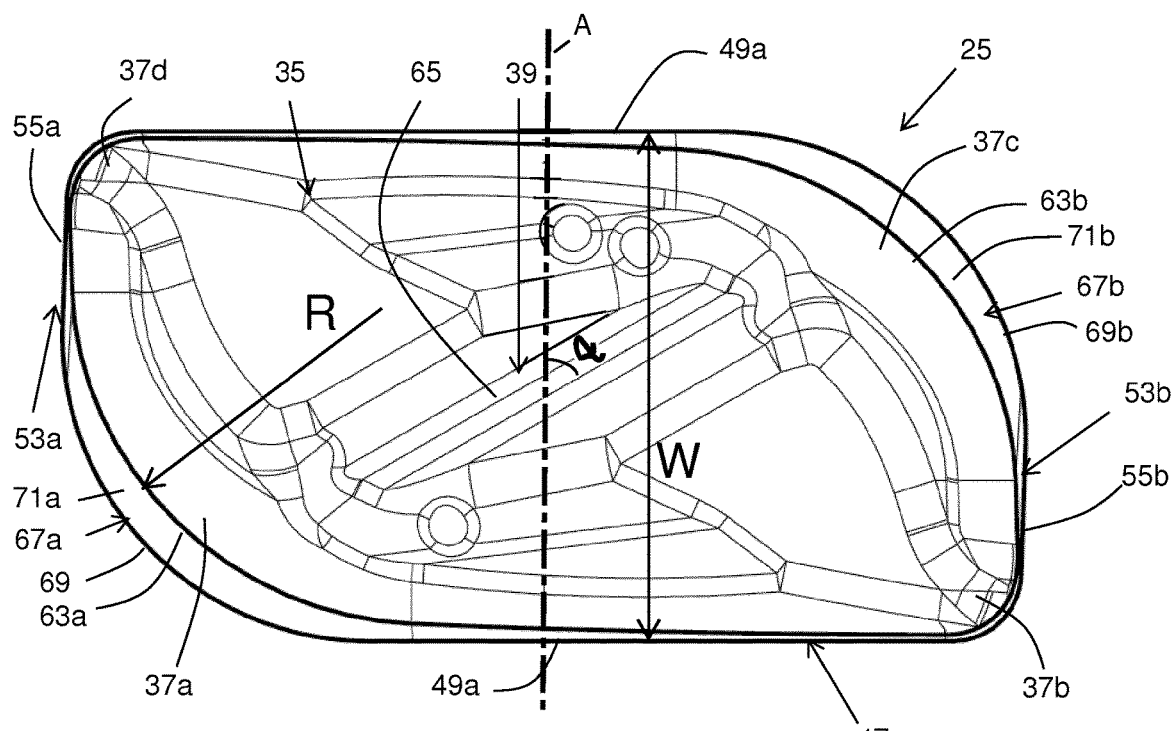
FIG. 14 is a top view of the cutting insert of FIG. 10.
Figure 15:
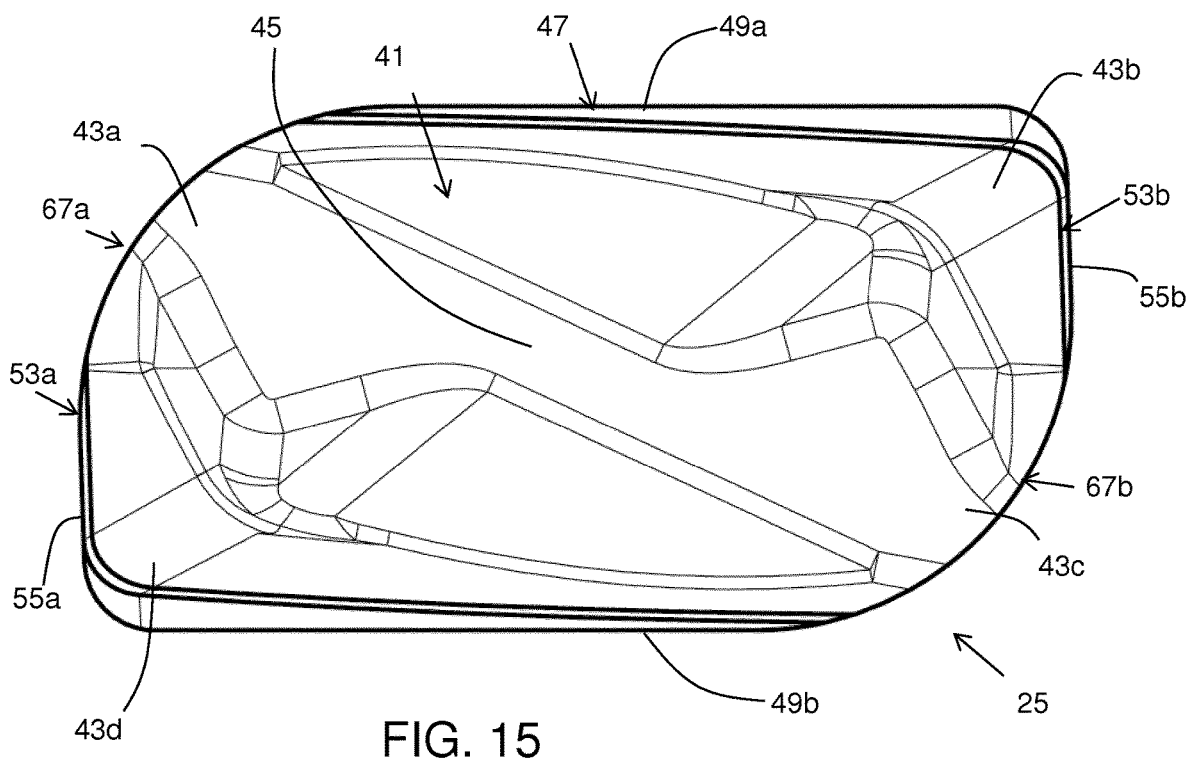
FIG. 15 is a bottom view of the cutting insert of FIG. 10.
Figure 18A:
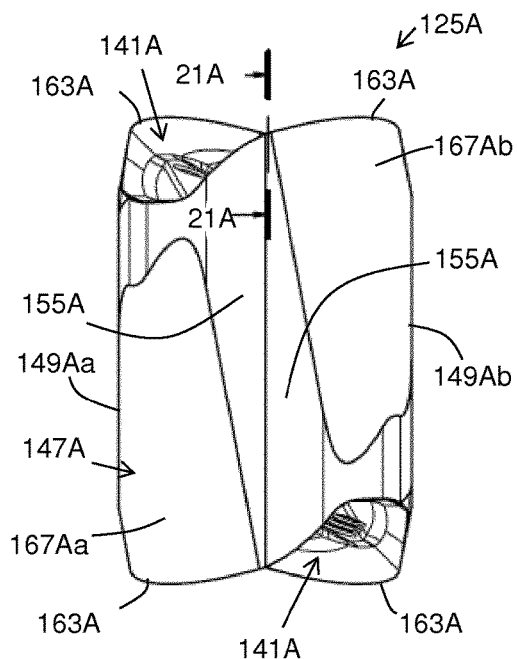
FIGS. 18A and 18B are end views of the cutting inserts of FIGS. 9A and 9B, respectively.
Figure 18B:
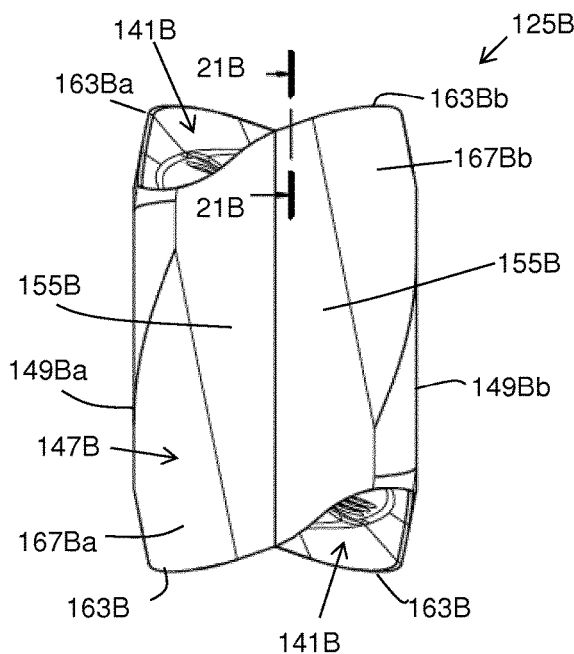
Figure 19A:
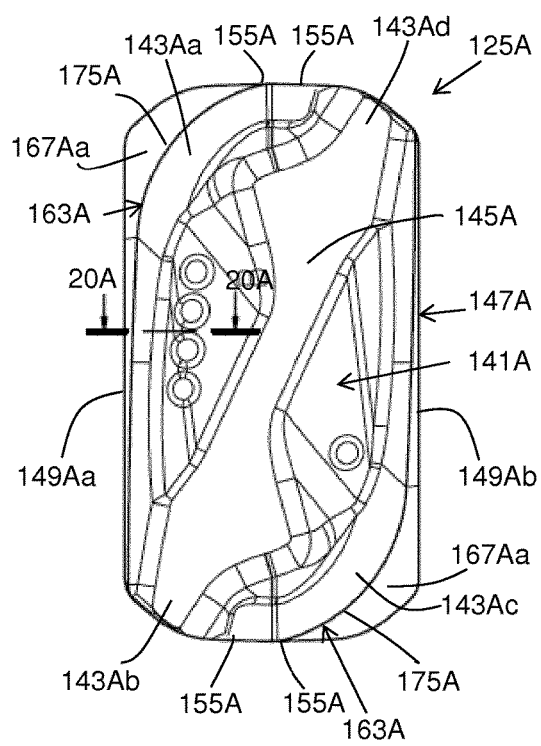
FIGS. 19A and 19B are end surface views of the cutting insert of FIGS. 9A and 9B.
Figure 19B:
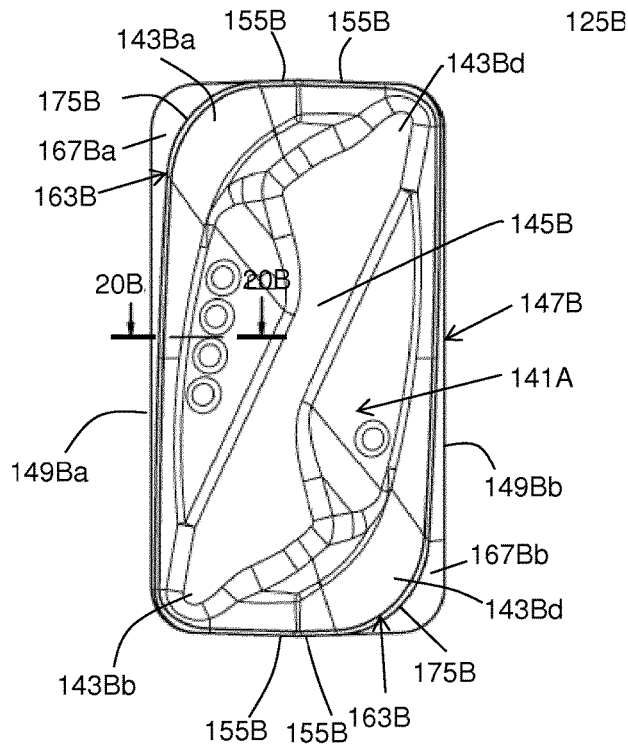
Figures 20A, 21A:
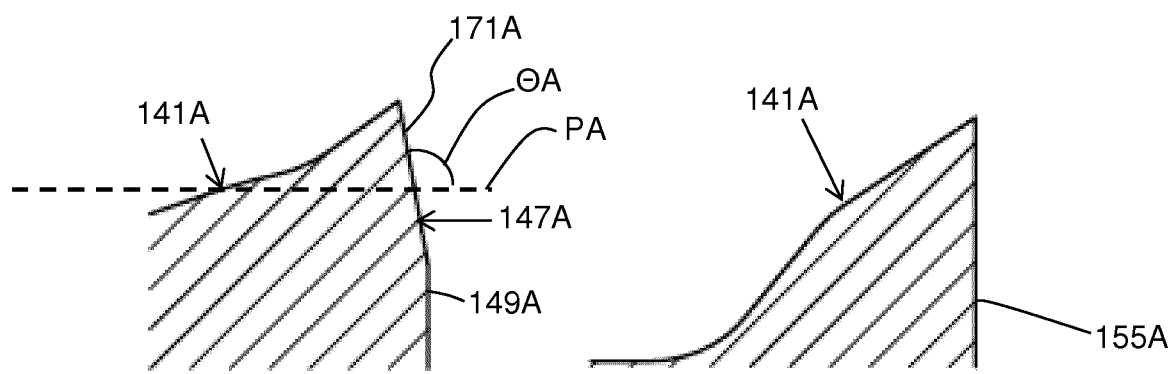
FIGS. 20A and 20B are cross-sectional views of the cutting insert of FIGS. 9A and 9B, respectively, taken at sections 20A-20A and 20B-20B, respectively, of FIGS. 19A and 19B, respectively.
FIGS. 21A and 21B are cross-sectional views of the cutting insert of FIGS. 9A and 9B, respectively, taken at sections 21A-21A and 21B-21B, respectively, of FIGS. 18A and 18B, respectively.
Figures 20B, 21B:
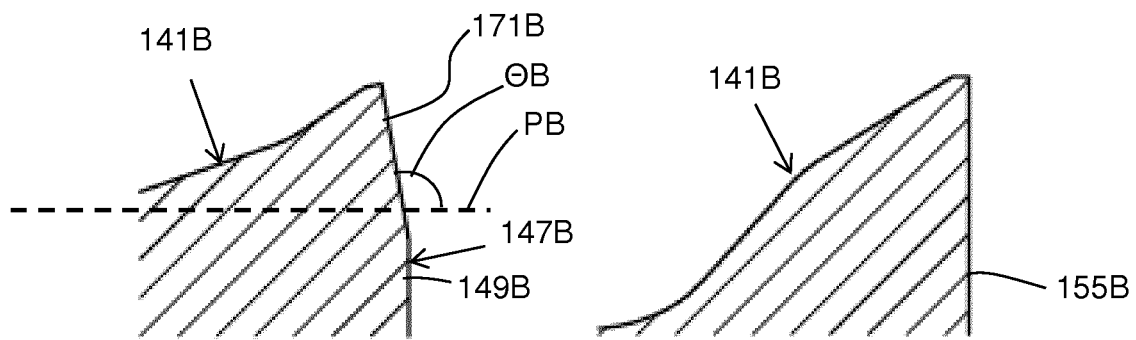

In the embodiment shown in FIGS. 8 and 10-15, the curved surface portion 67a-b is larger than the minor side surface 53a-b, i.e., extends a greater distance in the direction of the axis of the hole 51 than the minor side surface. Contrasted with the cutting insert 225 shown in FIG. 7 wherein each minor side surface 253 has two planar but non-coplanar supporting surface portions 255, each minor side surface 53a-b of the cutting insert 25 shown in FIGS. 8 and 10-15 has only a single, ordinarily planar supporting surface portion 55a-b. An adequate supporting surface portion cannot be provided on the curved surface portion 67a-b either because it would be too small to provide good support or because there is no space at all for the surface.

Accordingly, when the curved surface portion 67a-b and/or the cutting edges 63a-b defined in whole or in part by the intersection of the curved surface portion with the rake end surface 35 is larger than the minor side surface 53a-b, i.e., extends a greater distance in the direction of the axis of the hole 51 than the minor side surface, then the cutting insert 25 will typically be a single-sided cutting insert. Providing the central surface portion 39 of the cutting insert 25 at a greater distance from the central axis A of the hole 51 than the central supporting surface portion 45 ensures that the cutting insert cannot be incorrectly mounted as the hole 51 in the cutting insert will not properly align with the internally threaded hole 57 in the toolholder 23 and the threads 61 of the externally threaded screw 59 cannot mate with the internal threads of the internally threaded hole.

The two major side surfaces 49a and 49b can each include at least a portion of the surfaces that constitutes a major side surface supporting surface portion 73a and 73b. The major side surface supporting surface portions 73a and 73b are ordinarily planar.

A further aspect of the invention is seen in FIGS. 9A-9B and 16A-21B. FIGS. 9A, 16A, 17A, 18A, 19A, 20A, and 21A show views of a cutting insert 125A or portions thereof and FIGS. 9B, 16B, 17B, 18B, 19B, 20B, and 21B show views of a cutting insert 125B or portions thereof. Each of the cutting inserts 125A and 125B are usable with the toolholder 23 shown in FIGS. 3-6 to form a tool comprising one or more of the cutting inserts and the toolholder.

Each cutting insert 125A and 125B can comprise two opposing end surfaces 141A and 141B, respectively, each end surface having four corners 143Aa-d and 143Ba-d, respectively. The cutting inserts 125A and 125B can have one end surface 141A and 141B, respectively, that has a central surface portion 145A and 145B, respectively, or, as illustrated, two identical end surfaces 141A and 141B, respectively, that have, in centers thereof, a central surface portion 145A and 145B, respectively.

The cutting inserts 125A and 125B have peripheral side surfaces 147A and 147B, respectively, extending between the two end surfaces 141A and 141B. The peripheral side surface 147A and 147B of the cutting inserts 125A and 125B comprises two opposing major side surfaces 149Aa-b and 149Ba-b, respectively, two opposing minor side surfaces 153Aa-b and 153Ba-b, respectively, and two curved surface portions 167Aa-b and 167Ba-b, respectively, one curved surface portion of the two curved surface portions being disposed between each minor side surface and each major side surface.

A hole 151A and 151B extends through each cutting insert 125A and 125B, respectively, from one of the major side surfaces 149Aa and 149Ba to the other of the major side surfaces 149Ab and 149Bb. The cutting inserts 125A and 125B each include at least one cutting edge 163A and 163B, respectively, defined by an intersection of the peripheral side surface 147A and 147B, respectively, with at least one of the end surfaces 141A and 141B, respectively.

Each cutting edge 163A and 163B comprises a curved portion 175A (FIG. 19A) and 175B (FIG. 19B), respectively. As seen, for example, in FIGS. 19A and 19B, the curved portion 175A and 175B for each cutting edge 163A and 163B, respectively, extends over more than one quarter of a width W (FIG. 17A) of the cutting insert 125A and 125B, respectively, between the two major side surfaces 149Aa-149Ab and 149Ba-149Bb, respectively, in a direction of the axis A of the hole 151A and 151B, respectively. A normal width W for the inventive inserts is in the range of 7 to 9 mm. As seen, for example, in FIGS. 20A and 20B, a portion 171A and 171B of the peripheral side surface 147A and 147B, respectively, adjacent each cutting edge 163A and 163B defines an obtuse angle ΘA and ΘB, respectively, with planes PA and PB of the end surfaces 141A and 141B, respectively.

In the illustrated cutting inserts 125A and 125B, there are four cutting edges 163A and 163B, respectively. Two of the cutting edges 163A and 163B are defined by an intersection of the peripheral side surface 147A and 147B, respectively, with one of the two end surfaces 141A and 141B, respectively, and two of the cutting edges are defined by an intersection of the peripheral side surface with the other one of the two end surfaces.

In the illustrated cutting inserts 125A and 125B, each cutting edge 163A and 163B extends over less than one half of the width of the cutting insert between the two major side surfaces 149Aa-149Ab and 149Ba-149Bb, respectively, in the direction of the axis A of the hole 151A and 151B, respectively. The illustrated cutting inserts 125A and 125B are double-sided cutting inserts.

If the cutting edge extends over more than one half of the width of the cutting insert, it is presently believed that it will be preferable to provide a single-sided cutting insert because it is anticipated that there will be insufficient area on the minor side surface to provide a good supporting surface for abutting the minor side surface abutting surface 33 in the toolholder 23. When it is desired to provide a single-sided cutting insert, the central surface portion of the end surface of the cutting insert on which the cutting edges are disposed can be disposed at a greater distance from the axis of the hole than is the central surface portion of the opposing end surface as in the cutting insert 25 described in connection with FIGS. 1-2, 8, and 10-15, such as by providing a ridge on the central surface portion, where the ridge is ordinarily non-parallel to the central axis of the hole through the cutting insert and extends generally in a direction between two spaced apart cutting edges on the one of the end surfaces. In this way, it can be assured that the cutting insert cannot be incorrectly mounted in the pocket of the toolholder.

In the illustrated cutting inserts 125A and 125B, each minor side surface 153Aa-b and 153Ba-b, respectively, comprises a minor side supporting surface portion 155A and 155B, respectively, corresponding to a respective one of the cutting edges 163A and 163B, respectively. In the illustrated cutting inserts 125A and 125B, each minor side surface 153A and 153B, respectively, comprises more than one minor side supporting surface portion 155A and 155B, respectively, more specifically, two such minor side supporting surfaces. The two minor side supporting surfaces 155A and 155B on each minor side surface 153Aa-b and 153Ba-b are not coplanar.

In the illustrated cutting inserts 125A and 125B, the central surface portions 145A and 145B, respectively, of the end surfaces 141A and 141B, respectively, can define the planes PA and PB, respectively, of the end surfaces. The central surface portions 145A and 145B of the end surfaces 141A and 141B, respectively, can be planar. The two opposing end surfaces 141A and 141B can be identical.

Thus, the solution offered by U.S. application Ser. No. 14/569,960 is a tangentially mounted symmetrical insert which is designed to be double-sided and can be rotated in a way to have a total of 4 cutting edges. The symmetrical cutting insert has two cutting edges on an upper rake end surface and two cutting edges on a lower rake end surface, each with a radius in the range of e.g. 0.8 to 3.1 mm. This cutting insert has the tangential supporting rake end surfaces located at a symmetrical distance from the hole's centre so that the insert can be indexed about the centre axis of the hole.

To be able to fit bigger radii in the range of e.g. 4.0 to 6.3 mm on cutting inserts for the same toolholder the cutting inserts may have to be designed as single-sided cutting inserts to have a total of only two cutting edges on the upper rake end surface. It is therefore of great importance that the insert cannot be mounted "upside down" in the pocket seat of the cutter so that the operator uses one of the non-effective cutting edges, while this could result in tool breakage, wasted workpiece and possible injury to the operator.

The inventor has avoided the risk of wrongful positioning by means of a single-sided cutting insert with e.g. a ridge on the supporting end surface which may offset the hole enough so that the insert cannot be mounted upside down. The ridge may be angled so that it becomes aligned to an average direction of the chip flow. By having the ridge parallel to the cutting insert's natural chip flow it may minimize any interference.

The solution may have one or more of these benefits:
More symmetrical powder allocation within the insert.
Minimized influence on chip forming.
Minimum effect on insert production.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. Terms such as "major", "minor", "upper", "lower", "top", "bottom", "forward" and "rear" refer to features as shown in the current drawings and as perceived by the skilled person. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

The disclosures in EP Patent Application Nos. 16169608.3 and 16169611.7, from which this application claims priority, are incorporated herein by reference.

The invention claimed is:

1. A single-sided cutting insert, comprising:
a rake end surface having four corners and, in a center thereof, a central surface portion;
a supporting end surface having four corners and, in a center thereof, a central supporting surface portion;
a peripheral side surface extending between the rake end surface and the supporting end surface, the peripheral side surface including two opposing major side surfaces;
a hole extending through the cutting insert from one of the major side surfaces to another of the major side surfaces, wherein the central surface portion is disposed at a greater distance from a central axis of the hole than is the central supporting surface portion; and
a corner radii or cutting edge radii that extends over at least a quarter of a width of the cutting insert.

2. The cutting insert as set forth in claim 1, further comprising two spaced apart cutting edges on the rake end surface, each cutting edge being formed at an intersection of the peripheral side surface with the rake end surface.

3. The cutting insert as set forth in claim 2, wherein the two spaced apart cutting edges are disposed at non-adjacent corners of the rake end surface.

4. The cutting insert as set forth in claim 1 wherein the central surface portion includes a ridge.

5. The cutting insert as set forth in claim 4, wherein the ridge is non-parallel to the central axis of the hole.

6. The cutting insert as set forth in claim 4, wherein the ridge extends in a direction between two non-adjacent corners of the rake end surface.

7. The cutting insert as set forth in claim 4, wherein the ridge extends in a direction between two spaced apart cutting edges disposed at non-adjacent corners of the rake end surface.

8. The cutting insert as set forth in claim 1, wherein the peripheral side surface includes two opposing minor side surfaces.

9. The cutting insert as set forth in claim 8, wherein each minor side surface includes a supporting surface portion.

10. The cutting insert as set forth in claim 8, wherein the peripheral side surface includes a curved surface portion between each minor side surface and each major side surface.

11. The cutting insert as set forth in claim 8, wherein the curved surface portion is larger than the minor side surface.

12. The cutting insert as set forth in claim 8, wherein the supporting surface portion is planar.

13. The cutting insert as set forth in claim 10, wherein there are two curved surface portions, each curved surface portion including a portion closest to the supporting end surface that extends in a direction that is parallel with a portion closest to the supporting end surface on the other curved surface portion.

14. The cutting insert as set forth in claim 13, wherein each curved surface portion a portion closest to the rake end surface that forms a non-zero angle with a portion closest to the rake end surface on the other curved end surface.

15. The cutting insert as set forth in claim 1, wherein the two major side surfaces each include a planar supporting surface portion.

16. A cutting tool, comprising:
a toolholder, the toolholder including a cutting insert receiving pocket, the cutting insert receiving pocket having a major side surface abutting surface and a central supporting surface portion abutting surface; and
a single-sided cutting insert as set forth in claim 1, wherein one of the two major side surfaces of the cutting insert abuts the major side surface abutting surface and the central supporting surface portion abuts the central supporting surface portion abutting surface when the cutting insert is received in the cutting insert receiving pocket.

17. The cutting tool as set forth in claim 16, wherein the toolholder includes an internally threaded hole in the major side surface abutting surface, and further comprising a screw with external threads arranged to mate with internal threads of the internally threaded hole and to extend through the hole in the cutting insert to clamp the cutting insert in the cutting insert receiving pocket.

18. The cutting tool as set forth in claim 17, wherein the internally threaded hole in the toolholder and the hole in the cutting insert are axially aligned when either of the two major side surfaces of the cutting insert abuts the major side surface abutting surface and the central supporting surface portion abuts the central supporting surface portion abutting surface when the cutting insert is received in the cutting insert receiving pocket.

19. The cutting tool as set forth in claim 17, wherein the internally threaded hole in the toolholder and the hole in the cutting insert are axially mis-aligned when either of the two major side surfaces of the cutting insert abuts the major side surface abutting surface and the central surface portion abuts the central supporting surface portion abutting surface.

* * * * *